(12) United States Patent
Bonvallet et al.

(10) Patent No.: US 10,539,711 B2
(45) Date of Patent: Jan. 21, 2020

(54) LASER BEAM DETECTOR INCLUDING A LIGHT SOURCE FOR USE IN A LASER ATTRACTION

(71) Applicant: Z-Image, LLC, Firestone, CO (US)

(72) Inventors: John Bonvallet, Boulder, CO (US); Ted Ziemkowski, Firestone, CO (US)

(73) Assignee: Z IMAGE, LLC, Firestone, CO (US)

( * ) Notice: Subject to any disclaimer, the term of this patent is extended or adjusted under 35 U.S.C. 154(b) by 166 days.

(21) Appl. No.: 15/348,864

(22) Filed: Nov. 10, 2016

(65) Prior Publication Data

US 2018/0126259 A1    May 10, 2018

(51) Int. Cl.
G02B 27/20    (2006.01)
G01V 8/20    (2006.01)

(52) U.S. Cl.
CPC ............ *G01V 8/20* (2013.01); *A63F 2300/61* (2013.01)

(58) Field of Classification Search
CPC ...... A63F 9/0078; A63F 2300/61; G01V 8/20
See application file for complete search history.

(56) References Cited

U.S. PATENT DOCUMENTS

| | | | | |
|---|---|---|---|---|
| 5,495,357 A * | 2/1996 | Osterhout | ............... | H04B 1/38 340/4.4 |
| 6,685,480 B2 * | 2/2004 | Nishimoto | ............ | G09B 15/00 434/247 |
| 7,455,621 B1 * | 11/2008 | Anthony | ............ | A63B 21/0724 482/3 |
| 7,583,901 B2 * | 9/2009 | Nakagawa | ............... | G09F 9/33 398/183 |
| 7,661,679 B2 * | 2/2010 | Mah | ..................... | A63B 63/004 273/371 |
| 7,666,118 B1 * | 2/2010 | Anthony | ............ | A63B 21/0724 482/104 |
| 8,232,884 B2 * | 7/2012 | Pattok | ..................... | G08B 3/10 340/539.26 |
| 8,248,256 B1 * | 8/2012 | Gerardi | .................. | G08B 21/20 340/604 |
| 8,469,824 B1 * | 6/2013 | Farley | ........................ | F41J 5/02 434/11 |
| 9,170,154 B2 * | 10/2015 | Myrick | ...................... | G01J 3/02 |
| 9,245,333 B1 * | 1/2016 | Beck | ..................... | G06T 7/0002 |
| 9,279,711 B1 * | 3/2016 | Guldalian | ............. | G01F 23/292 |
| 9,305,441 B1 * | 4/2016 | Cronin | ..................... | G08B 7/06 |
| 9,652,949 B1 * | 5/2017 | Cronin | ..................... | G08B 7/06 |
| 2002/0105432 A1 * | 8/2002 | Pederson | ............. | B60Q 1/2611 340/815.45 |
| 2010/0004794 A1 * | 1/2010 | Ziemkowski | ........... | A63F 13/06 700/297 |

(Continued)

*Primary Examiner* — James S. McClellan
*Assistant Examiner* — Kevin M Carter
(74) *Attorney, Agent, or Firm* — Arent Fox LLP

(57) ABSTRACT

A method, system, apparatus, and computer-readable medium for operating a laser attraction. Aspects include instructing a plurality of laser transmitters to each emit a laser beam, each of the emitted laser beams being detected by a particular receiver device. In addition, a signal may be received that indicates that one of the laser beams has been broken. In an aspect, the signal may be received from a receiver device that is associated with the broken laser beam. Further, the receiver device may be instructed to illuminate a light source when the laser beam is broken, the light source being part of the receiver device.

20 Claims, 13 Drawing Sheets

(56) References Cited

U.S. PATENT DOCUMENTS

| | | | |
|---|---|---|---|
| 2011/0306435 A1* | 12/2011 | Seo | A63B 24/0003 |
| | | | 473/221 |
| 2012/0120973 A1* | 5/2012 | Ziemkowski | A63G 33/00 |
| | | | 372/29.02 |
| 2012/0319871 A1* | 12/2012 | Wise | B64F 1/20 |
| | | | 340/961 |
| 2013/0257607 A1* | 10/2013 | Rigby | B60R 16/02 |
| | | | 340/435 |
| 2015/0096876 A1* | 4/2015 | Mittleman | H01H 11/00 |
| | | | 200/341 |
| 2015/0278263 A1* | 10/2015 | Bowles | A63F 13/219 |
| | | | 463/43 |
| 2016/0261425 A1* | 9/2016 | Horton | G05B 15/02 |
| 2016/0361626 A1* | 12/2016 | Moore | A63F 9/0291 |
| 2017/0326444 A1* | 11/2017 | Hong | A63F 9/02 |
| 2018/0074497 A1* | 3/2018 | Tsuji | G06K 9/00288 |

* cited by examiner

LASER BEAM DETECTOR INCLUDING A LIGHT SOURCE FOR USE IN A LASER ATTRACTION

BACKGROUND

Field

The disclosure relates generally to laser attractions, and more particularly to, laser beam detectors that include light sources for illumination of the laser attraction.

Background

Laser maze attractions are entertaining and sometimes challenging games that bring out competitive and excited emotions from players. A successful attraction may appeal to a potential player by being relatively easy to understand, but offer a challenge to the player. Lights, sounds, and other effects may be used to grab the interest a potential player. From the operator's standpoint, a successful attraction may also be durable, easy to operate, and reliable. Durability may be a factor in attractions where a player is navigating an obstacle course, running, jumping, or otherwise moving.

For example, a laser maze attraction may include a series of laser transmitters, reflectors, and receiver devices (e.g., detectors/sensors) configured to provide laser beam obstructions in a laser maze enclosure. A player may be timed for completing the maze, and may receive penalties for breaking a laser beam.

A laser control module (LCM) may instruct a plurality of laser transmitters to each emit a laser beam. In addition, the LCM may monitor a plurality of receiver devices each corresponding to a laser transmitter. During game play, the LCM may calculate an elapsed time and deduct a penalty for any laser beam that is broken. A player interface of the laser maze may include a timer, a score display, and a button that may be actuated and/or an input device to start the timer for a round of game play.

SUMMARY

Some laser attractions are fabricated by building a room or assembling a prefabricated structure. The room and/or prefabricated structure may include lighting fixtures that are illuminated during serving and/or cleaning of the laser maze. In addition, the room and/or prefabricated structure may need to be illuminated when a player is exiting the laser attraction or during an emergency situation. Furthermore, a separate strobe light may be included in some laser attractions to enhance player experience. Conventionally, electrical installation, a lighting switch, and additional breaker circuit(s) are needed to provide lighting fixtures within the laser attraction. Lighting fixtures that need separate electrical instillation, a lighting switch, and additional breaker circuits may add to the cost and time needed to fabricate a laser attraction.

There exists an unmet need to provide illumination within a laser attraction without needing electrical installation, a lighting switch, and/or additional breaker circuit(s) to reduce the cost and time associated with fabrication.

The present disclosure provides a solution to the problem by providing a light source (e.g., one or more light emitting diodes (LEDs)) at the receiver devices that detect laser beams and are positioned around the laser attraction enclosure. In addition to being used to detect laser beams, the receiver devices of the present disclosure may be used to illuminate the laser attraction enclosure without separate lighting fixtures as may be used in conventional laser mazes.

Since receiver devices that detect laser beams are already connected to a power source, the additional illumination function of the present disclosure may be easily added to the receiver devices with a control line that turns on and/or off the light sources. For example, when the attraction is not being played, the LCM may instruct the light source in each receiver device to emit light to illuminate the laser attraction during a player exit period, during an emergency situation, during a laser beam alignment procedure, during a service/cleaning period, during a game idle period, and/or during a pre-game period.

Furthermore, the receiver devices of the present disclosure may also be used to provide lighting effects during game play. For example, during game play the light sources in the receiver devices may initially be turned off. However, when a laser beam is broken, the receiver device may emit flashes of light much like a strobe. Using the receiver device as a strobe may provide at least the following benefits: i) the player may be able to see which laser beam was broken by looking at the associated flashing receiver device; ii) the strobe effect of the flashing receiver device may enhance the game experience; and iii) using the receiver devices to provide the strobe effect may eliminate the need for a separate strobe light fixture within the laser attraction. By eliminating the need for installing separate light fixtures and/or strobe lights, that cost and time associated with laser maze fabrication of the present disclosure may be further reduced.

In an aspect of the disclosure, a method, a computer-readable medium, and an apparatus for a laser attraction are provided. The apparatus may instruct a plurality of laser transmitters to each emit a laser beam. In an aspect, each of the emitted laser beams may be detected by a particular receiver device. The apparatus may also receive a signal that indicates that one of the laser beams has been broken. In an aspect, the signal may be received from a receiver device that is associated with the broken laser beam. The apparatus may further instruct the receiver device to illuminate a light source when the laser beam is broken. In an aspect, the light source may be part of the receiver device.

In another aspect, the apparatus may determine that a laser game has ended. The apparatus may further instruct one or more receiver devices to each illuminate a light source when it is determined that the laser game has ended. In an aspect, each of the one or more receiver devices including a unique light source.

In a further aspect, the apparatus may determine that a detector in a receiver device is not detecting a laser beam. The apparatus may also instruct a light source in the receiver device to emit light at an intensity associated with a detector fault. Still further, the apparatus may determine if light emitted by the light source is detected by the detector.

In another aspect, the apparatus may instruct a first set of light sources in a first set of receiver devices to emit a first color of light and a second set of light sources in a second set of receiver devices to emit a second color of light. The apparatus may also determine that a number of receivers device in one or more of the first set or the second set that are hit by a laser beam during game play. Further, the apparatus may calculate a score based on the number of receiver devices in the one or more of the first set or the second set that are hit by the laser beam during game play. In an aspect, the score may be calculated based on a first point value associated with each of the receiver devices in the first set and a second point value associated with each of the receiver devices in the second set.

DETAILED DESCRIPTION

Figure 1:
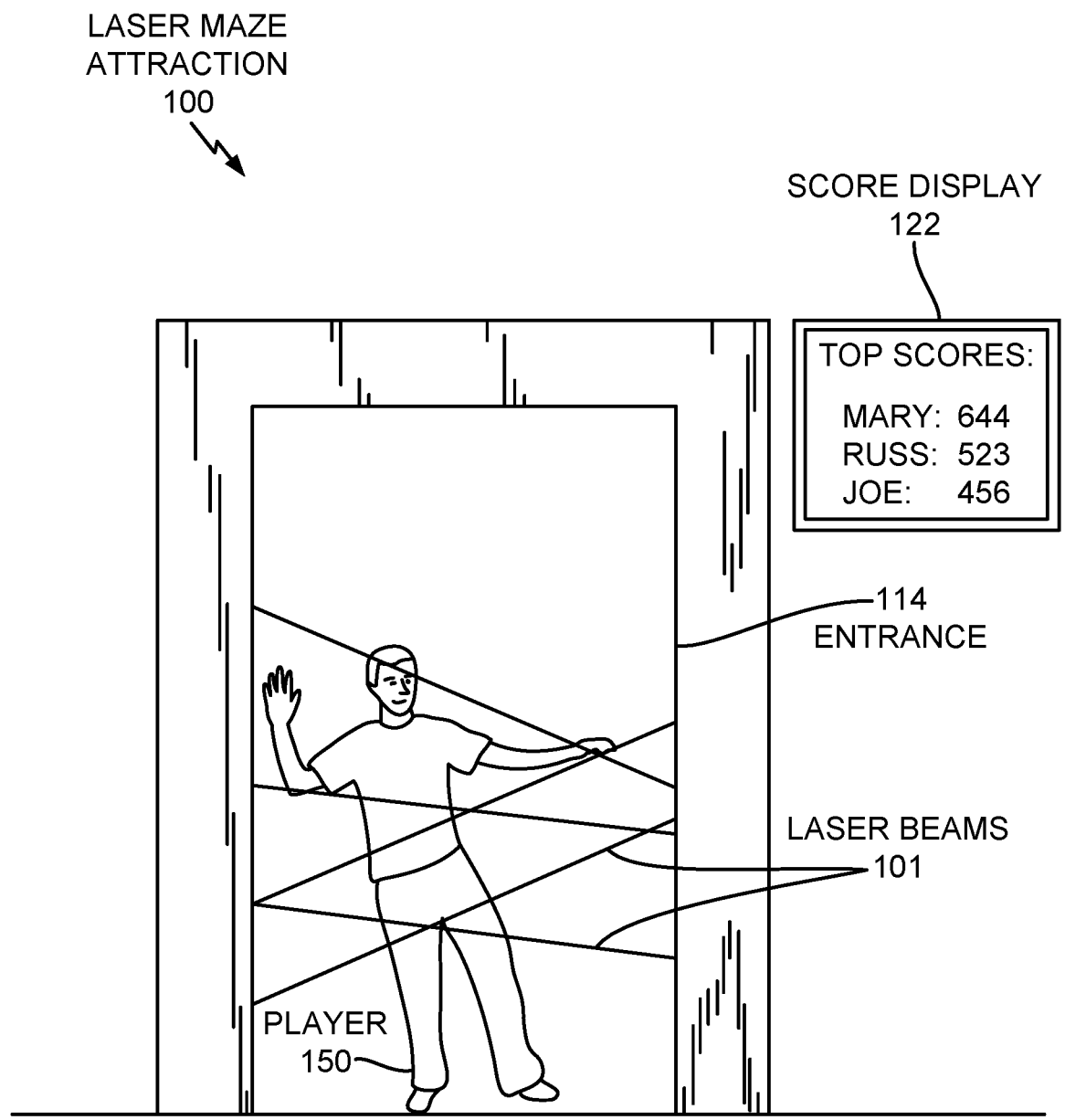
FIG. 1 is a diagram illustrating an example laser maze attraction.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A laser attraction, such as a laser maze, may have several lasers that are oriented across a pathway. Although example aspects are described in connection with a laser maze, the aspects may also be applicable to other laser attractions. In an example, a player may attempt to pass through the maze and may have penalties assessed for breaking a laser beam. In one aspect, a laser maze may be a circular or linear course with an entry and exit and sensors or buttons arranged to start and stop a timer.

The laser maze may be incorporated into other attractions, such as laser tag, puzzle solution, or other game component. In an aspect, the laser maze may be a timed event where each patron's score is individually calculated and compared to that of other patrons. In another aspect, two or more patrons may compete against each other or interact with each other during a round of game play.

In an aspect, one or more mirrors may be used to reflect the laser beam across the patron's pathway. A controller (e.g., an LCM) may instruct laser transmitters to emit laser beams using various inputs and may be configured to turn off a laser transmitter when the beam has been broken. In addition, the LCM may compute a score for a player based on the time needed to traverse the maze and any penalties incurred from broken laser beams. The score calculation may encourage a patron to quickly pass through the maze, but with the tradeoff of being careful not to trip a laser beam.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Several aspects of an LCM in communication with a laser maze attraction will now be presented with reference to various methods, apparatuses, and media. These methods, apparatuses, and media will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media may comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, include CD, laser disc, optical disc, and digital versatile disc (DVD), where disks usually reproduce data magnetically, while discs reproduce data optically with lasers. Combinations of the above should also be included within the scope of computer-readable media.

FIG. 1 is a diagram illustrating a laser maze attraction 100 in accordance with certain aspects of the present disclosure. The laser maze attraction 100 may include a series of laser beams that are oriented across a path which a player 150 attempts to follow without breaking the laser beams 101. Each laser transmitter (not illustrated in FIG. 1) may direct a laser beam 101 to a receiver device (not illustrated in FIG. 1) that is able to detect if the laser beam has been broken. In addition, the laser maze attraction 100 may be operated so that the player 150 receives a score that is a combination of the time required to navigate the path with a penalty for each laser beam that is broken/tripped. Other effects, such as lights, strobes, sounds, and motions may be added to the attraction and may be caused to operate with certain events or when a laser beam is tripped.

In an aspect, the laser maze attraction 100 may include an entrance 114 to a laser maze that a player 150 may attempt to navigate. Laser beams 101 may be oriented in any manner within the laser maze in order to produce obstructions to the path of the player 150. For example, the laser beams 101 may be oriented so that the player 150 may step across the laser beams 101, duck under the laser beams 101, slide to the side of a laser beam 101, crawl underneath a laser beam 101, or otherwise contort and slither through the maze.

In one aspect, different colored laser beams may be used with each color having a different penalty assigned thereto. For example, both green and red lasers beams may be present, with red lasers beams having a ten point penalty for each broken beam while assessing a five point penalty for breaking a green laser beam.

A score display 122 may be updated to show various data about player scores for the laser maze attraction 100. In one aspect, the top scores may be shown with a player's name. In another aspect, the scores of the last several players may be listed. The display 122 may also be used to display the rules of the attraction, how a score is calculated, advertisements for the attraction or other items, camera views of the player 150 in the maze, real time score for the current player, or other information. In a further aspect, the display 122 may change from one screen to another showing top scores, recent scores, or other information.

In an aspect, the laser maze attraction 100 may be configured with different versions of the laser maze game. Each version of the laser maze game may combine different configurations of laser beams 101 that may be used to obstruct a path. For example, an easy version of the laser maze may have a subset of the entire set of lasers operational, while a difficult version of the laser maze game may have the entire set of lasers illuminated. In addition, different point values or scores may be assessed for each version of the game.

In another aspect, the laser maze attraction 100 may be configured with different types of games. For example, the laser maze attraction 100 may be configured with a "Beam Buster" challenge in which the player 150 races through the maze and breaks as many laser beams as possible while being timed. In a different game, certain laser beams may be turned off and corresponding receiver devices illuminated as targets for the user to hit with a laser beam that is emitted from a user device (e.g., laser watch, laser pointer, or laser toy). The player 150 may acquire additional points for hitting the illuminated receiver device(s) while traversing the laser maze attraction 100.

Figure 2A:
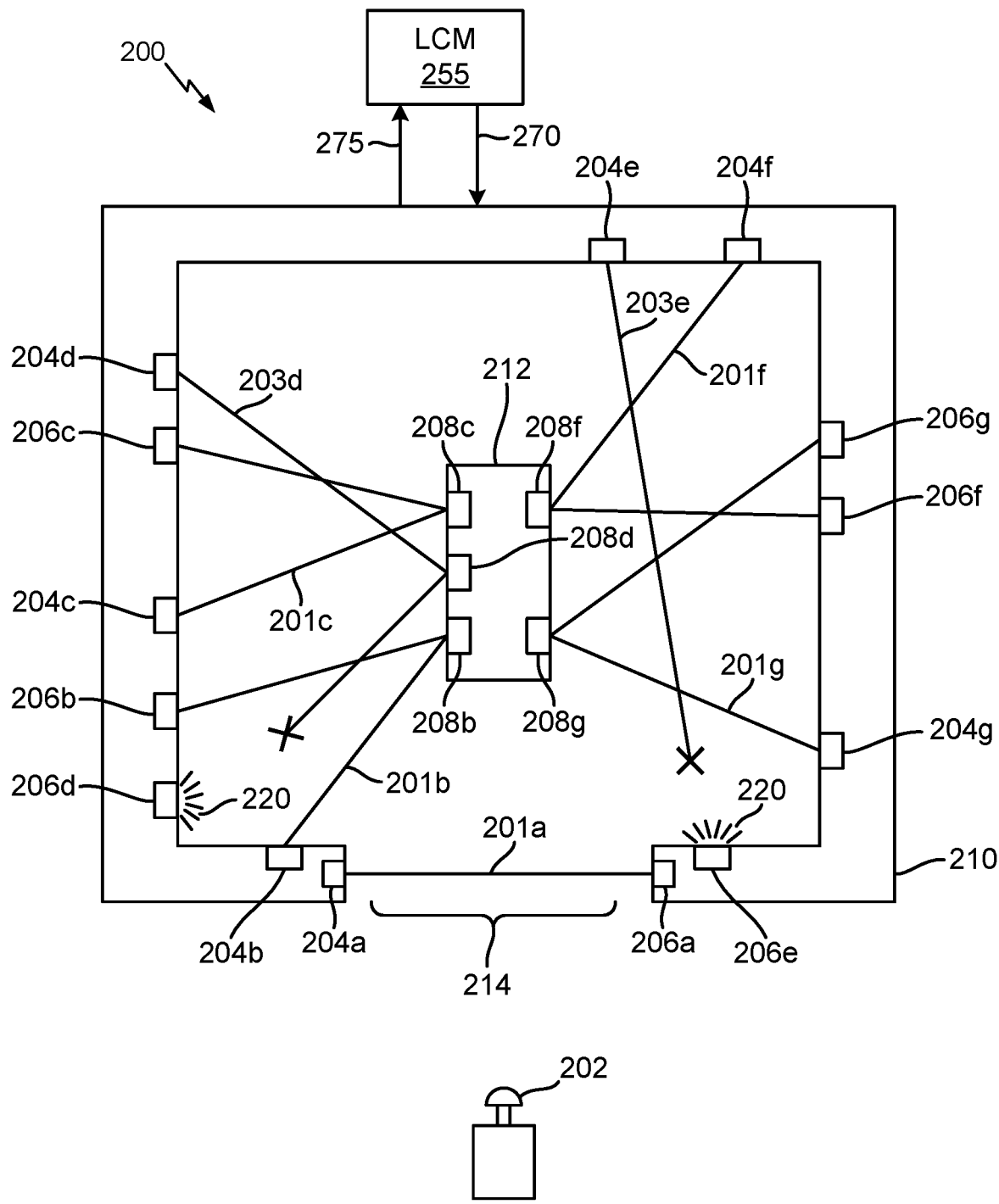
FIG. 2A is a diagram illustrating a laser maze attraction in which receiver devices may be illuminated and/or emit flashes of light when a laser beam is broken during game play

FIG. 2A is a diagram illustrating a laser maze attraction 200 in which receiver devices may be illuminated and/or emit flashes of light when a laser beam is broken during game play. In an aspect, the laser maze attraction 200 may include a maze enclosure 210, a maze island 212 around which the player (not illustrated in FIG. 2A) may travel, and a maze entrance/exit 214. Further, the laser maze attraction 200 may include a button 202 that the player actuates to begin a round of game play. Alternatively, game play may automatically start without the need for the player to actuate a button 202. In addition, an LCM 255 may send one or more signals 270 to and receive one or more signals 275 from the laser maze attraction 200.

Referring to FIG. 2A, multiple laser transmitters 204a, 204b, 204c, 204d, 204e, 204f, 204g may be positioned around the perimeter of maze enclosure 210. In an aspect, LCM 255 may instruct laser transmitters 204a, 204b, 204c, 204d, 204e, 204f, 204g to each emit a laser beam 201a, 201b, 201c, 203d, 203e, 201f, 201g. In an aspect, each of the laser beams may be detected by a corresponding receiver device 206a, 206b, 206c, 206d, 206e, 206f, 206g. In one aspect, multiple mirrors 208b, 208c, 208d, 208f, 208g may be positioned around maze island 212 and used to reflect laser beams 201b, 201c, 203d, 201f, 201g emitted by certain laser transmitters 204b, 204c, 204d, 204f, 204g to provide an additional challenge to the player.

In the example illustrated in FIG. 2A, a player traversing the laser maze attraction 200 breaks the laser beam 203d emitted by laser transmitter 204d and the laser beam 203e emitted by laser transmitter 204e. In this example, the LCM 255 may receive a signal 275 from receiver device 206d that indicates that the corresponding laser beam 203d has been broken. Upon determining that the laser beam 203d was broken, LCM 255 may send a signal 270 instructing receiver device 206d to illuminate 220 an associated light source (not seen in FIG. 2A). For example, the light source may be an LED positioned within or on the surface of the receiver device 206d. Similarly, the LCM 255 may receive a signal 275 from receiver device 206e that indicates that the corresponding laser beam 203e has been broken. Upon determining that the laser beam 203e was broken, LCM 255 may send a signal 270 instructing receiver device 206e to illuminate 220 an associated light source (not seen in FIG. 2A). For example, the light source may be an LED positioned within or on the surface of the receiver device 206e.

Various example embodiments associated with FIG. 2A are discussed infra with respect to communications between receiver device 206d and LCM 255 for simplicity. However, one of ordinary skill will understand that the example embodiments may pertain to communications between the LCM and any receiver device that detects that a laser beam has been broken without departing from the scope of the present disclosure.

Referring to FIG. 2A, in a first exemplary embodiment, the signal 270 sent by the LCM 255 may instruct receiver device 206d to emit flashes of light 220 for a first duration. For example, receiver device 206d may emit flashes of light 220 for five seconds to indicate that the laser beam 203d is broken. In addition, the signal 270 may instruct receiver device 206d to emit a particular color of light without flashing for a second duration. For example, the particular color may be associated with a point value associated with the broken laser beam 203d. In an aspect, the second duration may follow the first duration. For example, receiver device 206d may emit flashes of light 220 for a first duration, and emit a particular color for the second duration. In an aspect, the second duration may be the remainder of game play. At the end of game play, the LCM 255 may determine a player score level associated with game play, and send a signal 270 instructing one or more receiver devices 206a, 206b, 206c, 206d, 206e, 206f, 206g to emit a color associated with the determined player score level to alert the player of her/his score level.

Referring to FIG. 2A, in a second example, the LCM 255 may configure the laser maze attraction 200 for "Beam Buster®" mode. In Beam Buster® mode, each of the laser transmitters 204a, 204b, 204c, 204d, 204e, 204f, 204g emits a laser beam, and a player races through the laser maze attraction 200 to attempt to break as many laser beams in a predetermined time period, or as quickly as possible until all the beams are broken. Each time a player breaks a laser beam, a corresponding receiver device 206a, 206b, 206c, 206d, 206e, 206f, 206g may send a signal 275 to the LCM indicating that the corresponding laser beam was broken. The LCM 255 may determine a point value associated with the laser beam that has been broken. In addition, the LCM 255 may send a signal 270 instructing the receiver device to emit a particular color 220 associated with the point value. In one aspect, the LCM 255 may instruct the receiver device to emit flashes of light 220 for a first duration and the color associated with the point value of the broken laser beam for a second duration.

Figure 2B:
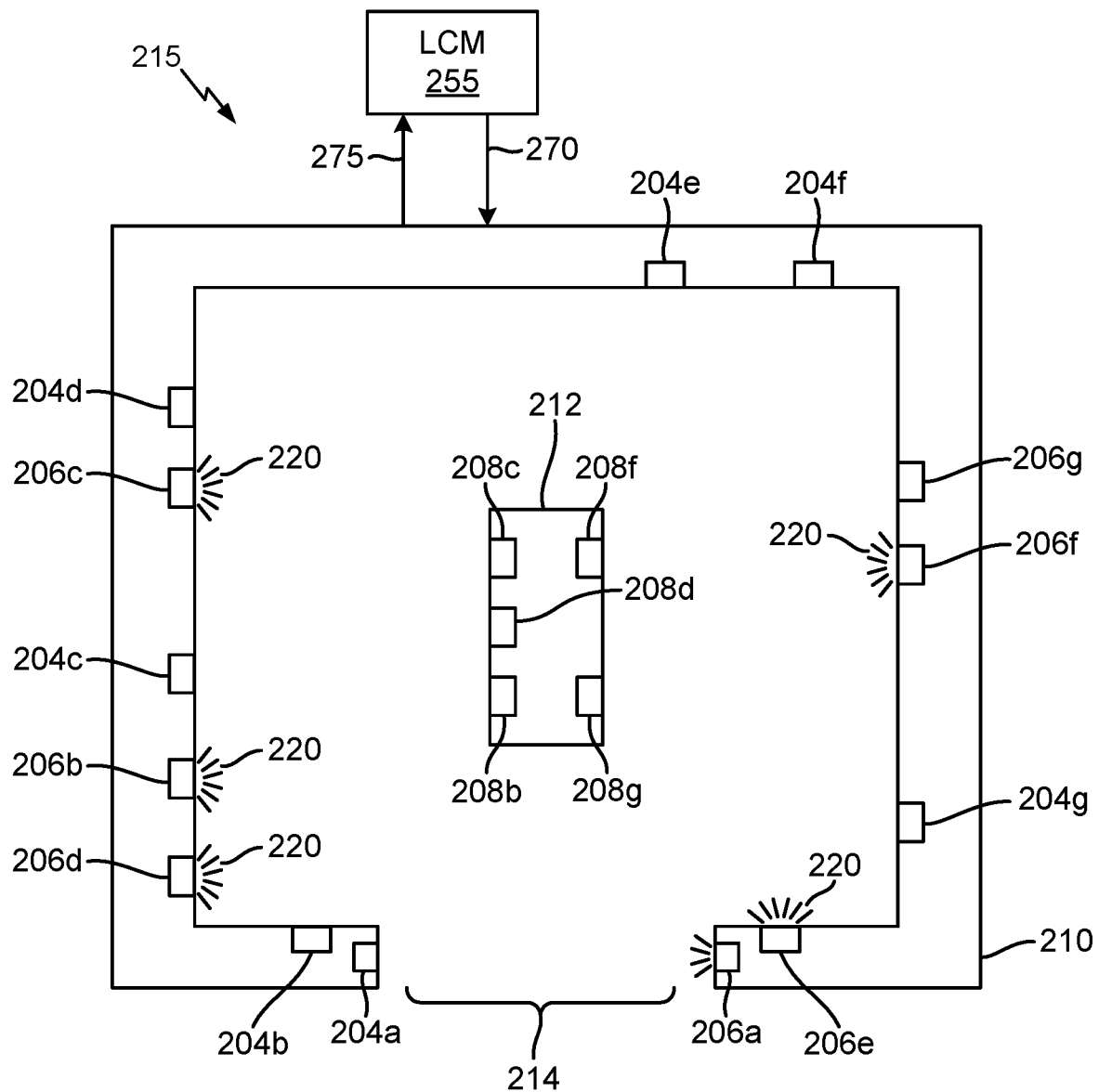
FIG. 2B is a diagram illustrating a laser maze attraction in which receiver devices may be illuminated to provide visibility within the maze enclosure.

FIG. 2B is a diagram illustrating a laser maze attraction 215 in which receiver devices may be illuminated to provide visibility within the maze enclosure 210. In an aspect, the laser maze attraction 215 may include a maze enclosure 210, a maze island 212 around which the player (not illustrated in FIG. 2A) may travel, and a maze entrance/exit 214. In other examples, the laser maze attraction 215 may be configured without a maze island. In addition, an LCM 255 may send one or more signals 270 to and receive one or more signals 275 from the laser maze attraction 215.

As illustrated in FIG. 2B, LCM 255 may determine that game play (e.g., such as the game play illustrated in FIG. 2A) has ended. In an aspect, LCM 255 may send a signal 270 to the laser maze attraction 215 instructing one or more of the receiver devices 206a, 206b, 206c, 206d, 206e, 206f, 206g to each illuminate 220 a light source when it is determined that game play has ended. In an aspect, each of the one or more receiver device 206a, 206b, 206c, 206d, 206e, 206f, 206g may each include a unique light source (e.g., an LED). In another aspect, the LCM 255 and/or receiver devices 206a, 206b, 206c, 206d, 206e, 206f, 206g may set an intensity of illumination 220 using pulse width modulation and/or other methods of varying an intensity of light output.

In a first example associated with FIG. 2B, LCM 255 may determine that game play has ended and that a user exit period is beginning. In an aspect, LCM 255 may instruct each of the one or more receiver devices 206a, 206b, 206c, 206d, 206e, 206f, 206g to illuminate 220 an associated light source to an intensity associated with the user exit period.

In a second example associated with FIG. 2B, LCM 255 may determine that game play has ended due to an emergency situation. In an aspect, LCM 255 may instruct each of the one or more receiver devices 206a, 206b, 206c, 206d, 206e, 206f, 204g to illuminate 220 an associated light source to an intensity associated with the emergency situation.

In a third example associated with FIG. 2B, LCM 255 may determine that game play has ended and that a laser beam alignment procedure is beginning. In an aspect, LCM 255 may instruct each of the one or more receiver devices 206a, 206b, 206c, 206d, 206e, 206f, 204g to illuminate 220 an associated light source to an intensity associated with the laser beam alignment procedure.

In a fourth example associated with FIG. 2B, LCM 255 may determine that a service period is beginning. For example, the service period may be for the purposes of cleaning the interior of the laser maze enclosure 210. In an aspect, LCM 255 may instruct each of the one or more receiver devices 206a, 206b, 206c, 206d, 206e, 206f, 204g to illuminate 220 an associated light source to an intensity associated with the service period.

In a fifth example associated with FIG. 2B, LCM 255 may determine that a game idle period is beginning. In an aspect, LCM 255 may instruct each of the one or more receiver devices 206a, 206b, 206c, 206d, 206e, 206f, 204g to emit flashes of light 220 during the game idle period. The flashing light 220 during the game idle period may be used to entice or attract players to the laser maze attraction 215.

In a sixth example associated with FIG. 2B, LCM 255 may determine that a pre-game period is beginning. In an aspect, LCM 255 may instruct each of the one or more receiver devices 206a, 206b, 206c, 206d, 206e, 206f, 204g to illuminate 220 an associated light source to an intensity associated with the pre-game period. For example, illuminating the laser maze attraction during a pre-game period may assuage a younger player's fear of entering a dark or dimly lit space.

Figure 2C:
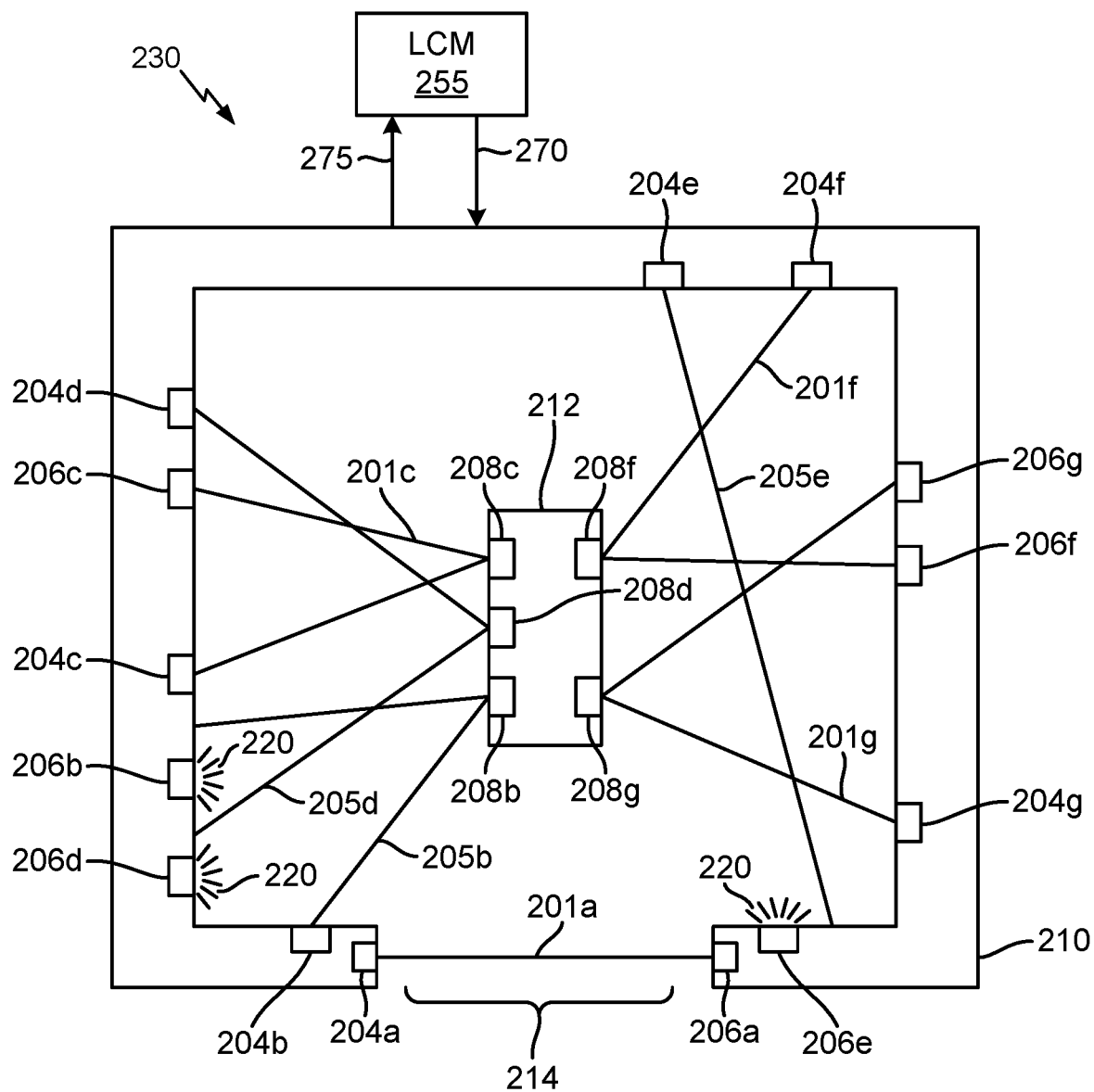
FIG. 2C is a diagram illustrating a laser maze attraction in which receiver devices may be illuminated and/or emit flashes during a diagnostic test for detector function.

FIG. 2C is a diagram illustrating a laser maze attraction 230 in which receiver devices may be illuminated and/or emit flashes during a diagnostic test for detector function. In an aspect, the laser maze attraction 230 may include a maze enclosure 210, a maze island 212 around which the player (not illustrated in FIG. 2A) may travel, and a maze entrance/exit 214. In addition, an LCM 255 may send one or more signals 270 to and receive one or more signals 275 from the laser maze attraction 200.

Referring to FIG. 2C, multiple laser transmitters 204a, 204b, 204c, 204d, 204e, 204f, 204g may be positioned around the perimeter of maze enclosure 210. In an aspect, LCM 255 may instruct laser transmitters 204a, 204b, 204c, 204d, 204e, 204f, 204g to each emit a laser beam 201a, 205b, 201c, 205d, 205e, 201f, 201g. In an aspect, laser beams may be detected by a corresponding receiver device 206a, 206b, 206c, 206d, 206e, 206f, 206g. In one aspect, multiple mirrors 208b, 208c, 208d, 208f, 208g may be positioned around maze island 212 and used to reflect laser beams emitted by certain laser transmitters 204b, 204c, 204d, 204f, 204g to provide an additional challenge during game play.

As seen in FIG. 2C, the laser transmitters 204b, 204d, 204e are not properly aligned with the corresponding receiver devices 206b, 206d, 206e. In an aspect, LCM 255 may determine that receiver devices 206b, 206d, 206e (e.g., a detector in the receiver devices) are not detecting the corresponding laser beams 205b, 205d, 205e based on one or more signals 275 received from the receiver devices 206b, 206d, 206e. To perform a diagnostic test of detector function, LCM 255 may instruct receiver devices 206b, 206d, 206e to each emit light 220 at an intensity that may be detected by a corresponding detector located in receiver devices 206b, 206d, 206e. In addition, the LCM 255 may send a signal 270 instructing the receiver devices 206b, 206d, 206e to emit flashes of light 220 when the LCM 255 determines that the light 220 emitted by the receiver light source is detected by the detector. By emitting flashes of light 220, an operator may more easily determine which laser transmitters 204b, 204d, 204e require alignment. Once the laser transmitters 204b, 204d, 204e are in proper alignment, the receiver devices 206b, 206d, 206e may send a signal 275 to the LCM 255 indicating that the laser detectors are detecting the corresponding laser beams 205b, 205d, 205e. The LCM 255 may send a signal 270 instructing the receiver devices 206b, 206d, 206e to stop emitting flashes of light 220 when the LCM 255 determines that the detector detects the laser beam.

Figure 2D:
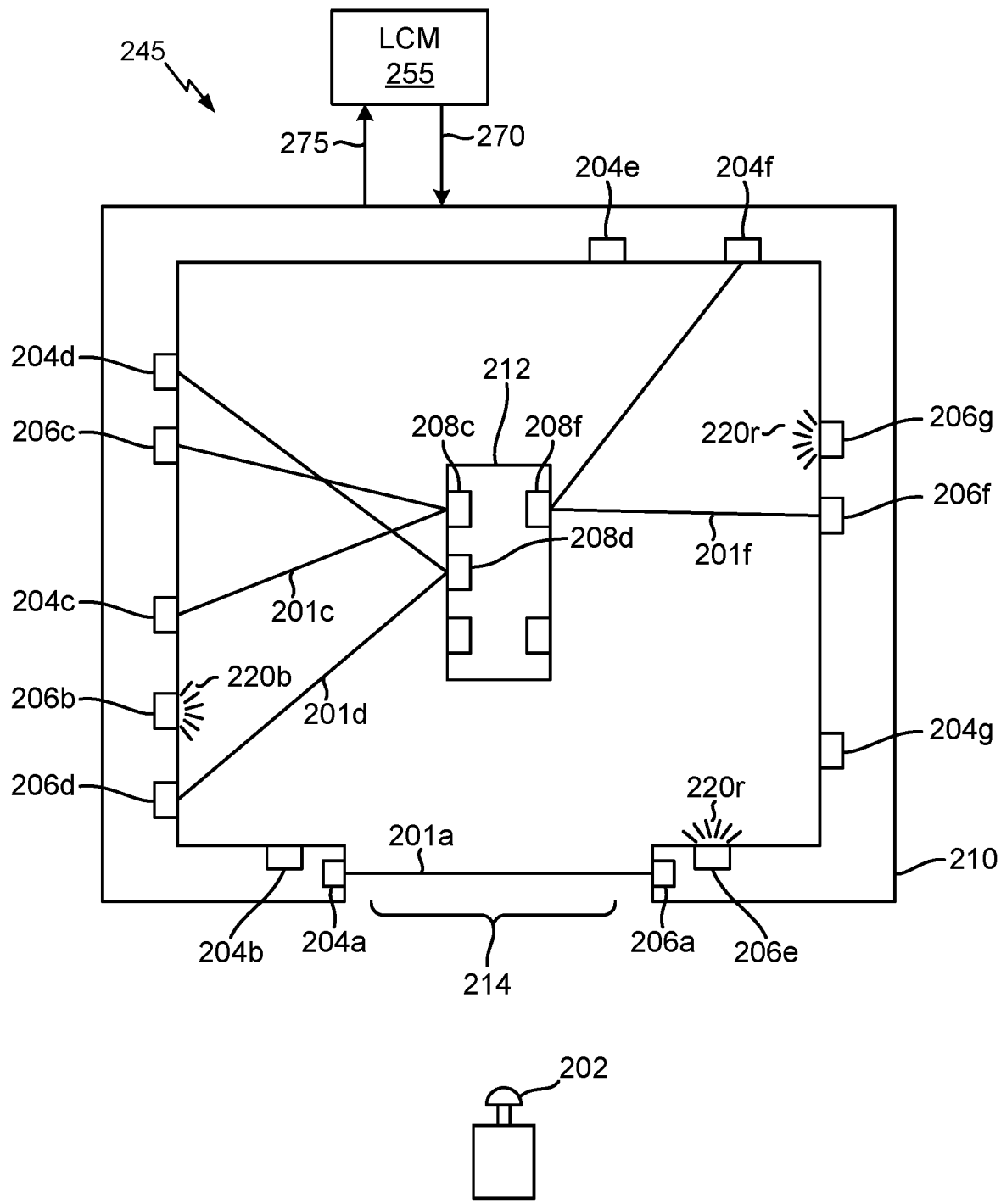
FIG. 2D is a diagram illustrating a laser maze attraction in which receiver devices may be illuminated for use as visible targets for a player to hit with a laser beam while traversing the laser maze.

FIG. 2D is a diagram illustrating a laser maze attraction 245 in which receiver devices may be illuminated for use as visible targets for a player to hit with a laser beam while traversing the laser maze. For example, the player enters the laser maze with a laser watch, a laser pointer, or a toy that emits a laser beam and/or other light source and can be used to hit a target.

In an aspect, the laser maze attraction 245 may include an enclosure 210, a maze island 212 around which the player (not illustrated in FIG. 2D) may travel, and a maze entrance/exit 214. Further, the laser maze attraction 245 may include a button 202 that the player actuates to begin a round of game play. Alternatively, game play may automatically start without the need for the player to actuate a button 202. In addition, an LCM 255 may send one or more signals 270 to and receive one or more signals 275 from the laser maze attraction 245.

Referring to FIG. 2D, multiple laser transmitters 204a, 204b, 204c, 204d, 204e, 204f, 204g may be positioned around the perimeter of enclosure 210. In an aspect, LCM 255 may instruct certain laser transmitters 204a, 204c, 204d, 204f to each emit a laser beam 201a, 201c, 203d, 201f. Further, each of the laser beams 201a, 201c, 203d, 201f may be detected by a corresponding receiver device 206a, 206c, 206d, 206f. In one aspect, multiple mirrors 208c, 208d, 208f may be positioned around maze island 212 and used to reflect laser beams emitted by certain laser transmitters 204c, 204d, 204f to provide an additional challenge during game play. Further, LMC may instruct a first set of laser transmitters 204b, 204e, 204g not to emit a laser beam.

In addition, LCM 255 may instruct a first set receiver devices (e.g., receiver device 206b) to emit a first color of light 220b (e.g., blue light) and a second set of receiver devices (e.g., receiver devices 206e, 206g) to emit a second color of light 220r (e.g., red light). Alternatively, the LCM 255 may not instruct any laser transmitter to emit a laser beam and instead instruct all of the receiver devices 206a, 206b, 206c, 206d, 206e, 206f, 206g to emit a corresponding color of light.

During game play, each receiver device 206b, 206e, 206g that a player hits with a laser beam may cause a signal 275 to be sent to LCM 255 indicating a target hit. The LCM 255 may determine that a number of receivers device 206b, 206e, 206g in the first set and/or the second set that are hit during game play. In addition, LCM 255 may calculate a score based on the number of receiver devices in the first set and/or the second set that are hit during game play. For example, the score may be calculated based on a first point value (e.g., 2 points for a blue target) associated with each of the receiver devices in the first set and a second point value (e.g., five points for a red target) associated with each of the receiver devices in the second set. If the game mode includes laser beams 201a, 201c, 201d, 201f obstructions, the score may be calculated based on how quickly the player traverses the laser maze, how many of the laser beams 201a, 201c, 201d, 201f are broken (e.g., similar to in FIG. 2A), and the points gained by hitting target receiver devices 206b, 206e, 206g. Alternatively, if the game mode does not include laser beams obstructions, then the score may be calculated based on how quickly the player traverses the laser maze and/or how many of the target receiver devices are hit.

Figure 3:
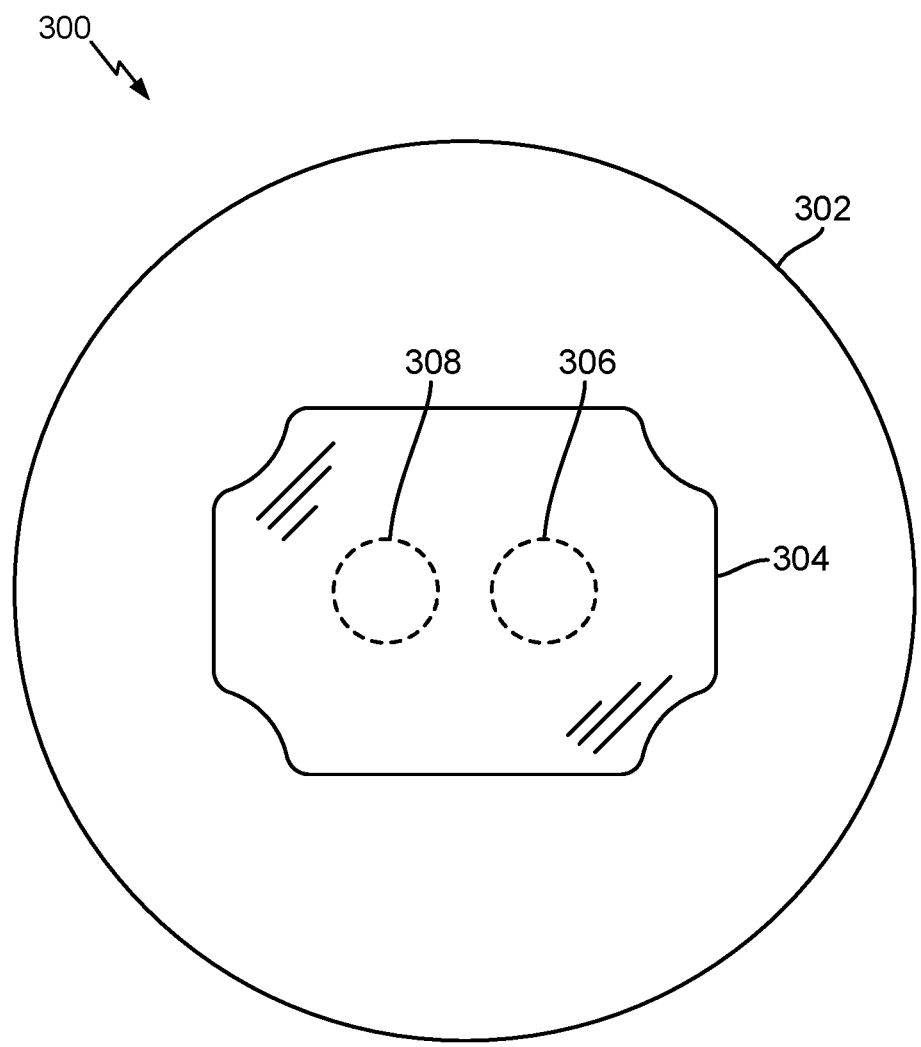
FIG. 3 is a diagram illustrating a receiver device 300 that may be used in one of the laser maze attractions illustrated in FIGS. 2A, 2B, 2C, and/or 2D.

FIG. 3 is a diagram illustrating a receiver device 300 that may be used in accordance with one or more aspects of the present disclosure. For example, the receiver device 300 may be used in conjunction with one or more of the laser maze attractions 200, 215, 230, 245 discussed supra with respect FIGS. 2A, 2B, 2C, and/or 2D.

Referring to FIG. 3, the receiver device 300 may include a mount 302 that is used to mount the receiver device 300 a surface of a maze enclosure (e.g., such as maze enclosure 210). In addition, a window 304 may be formed in the mount 302. For example, the window 304 may be formed from a transparent or semi-transparent material (e.g., plastic) that allows a laser beam to pass through. A detector 308 and light source 306 may be positioned behind the window 304 as to be protected from damage during game play. The detector 308 may be used to detect a laser beam, and the light source 306 may be used for purposes of illumination within the maze enclosure or for game effects. The detector 308 and/or light source 306 may be connected to an LCM (e.g., LCM 255) via a wired connection or a wireless connection.

Figure 4A:
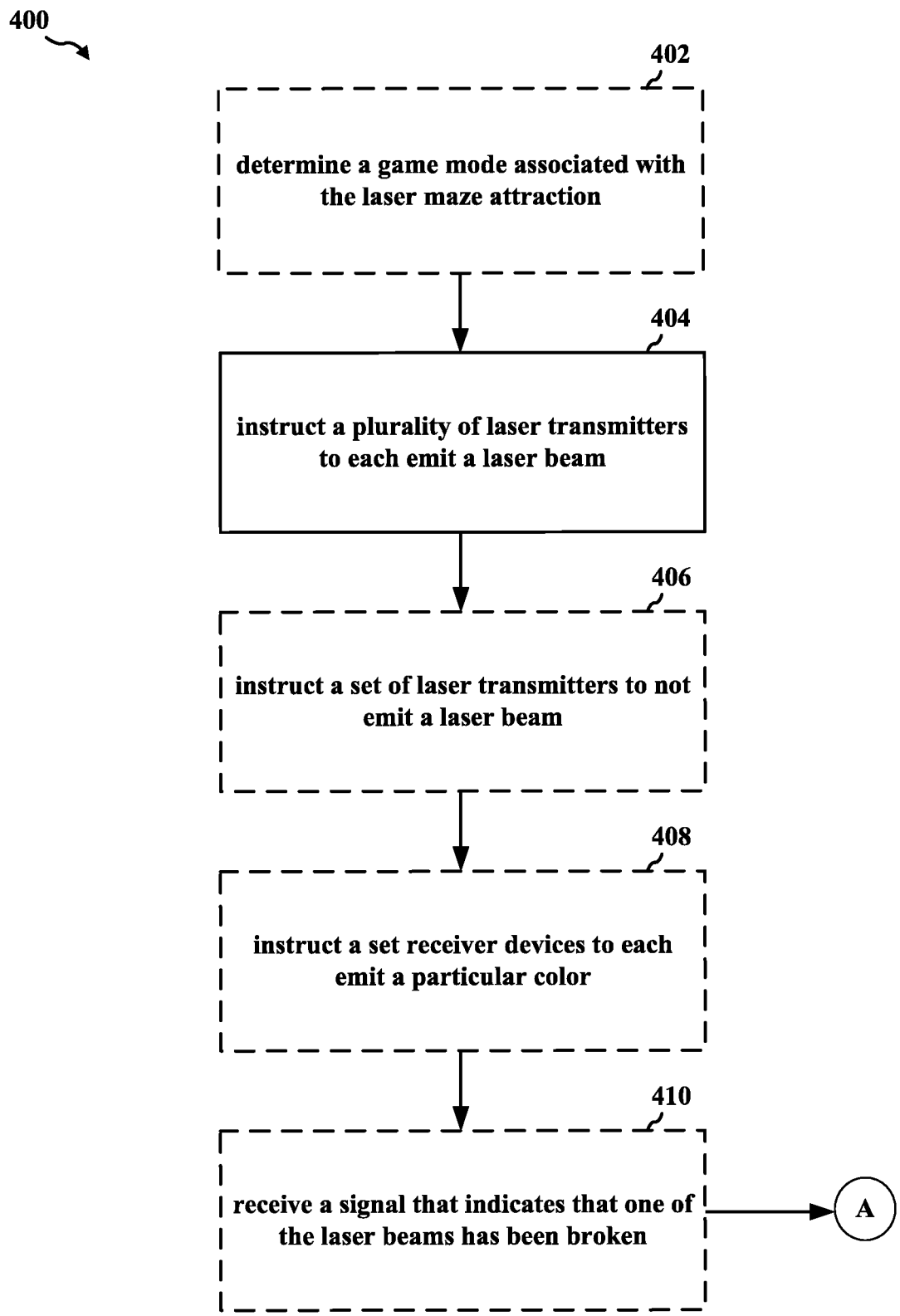
FIGS. 4A and 4B are a flowchart of a method of operating a laser attraction.
Figure 4B:
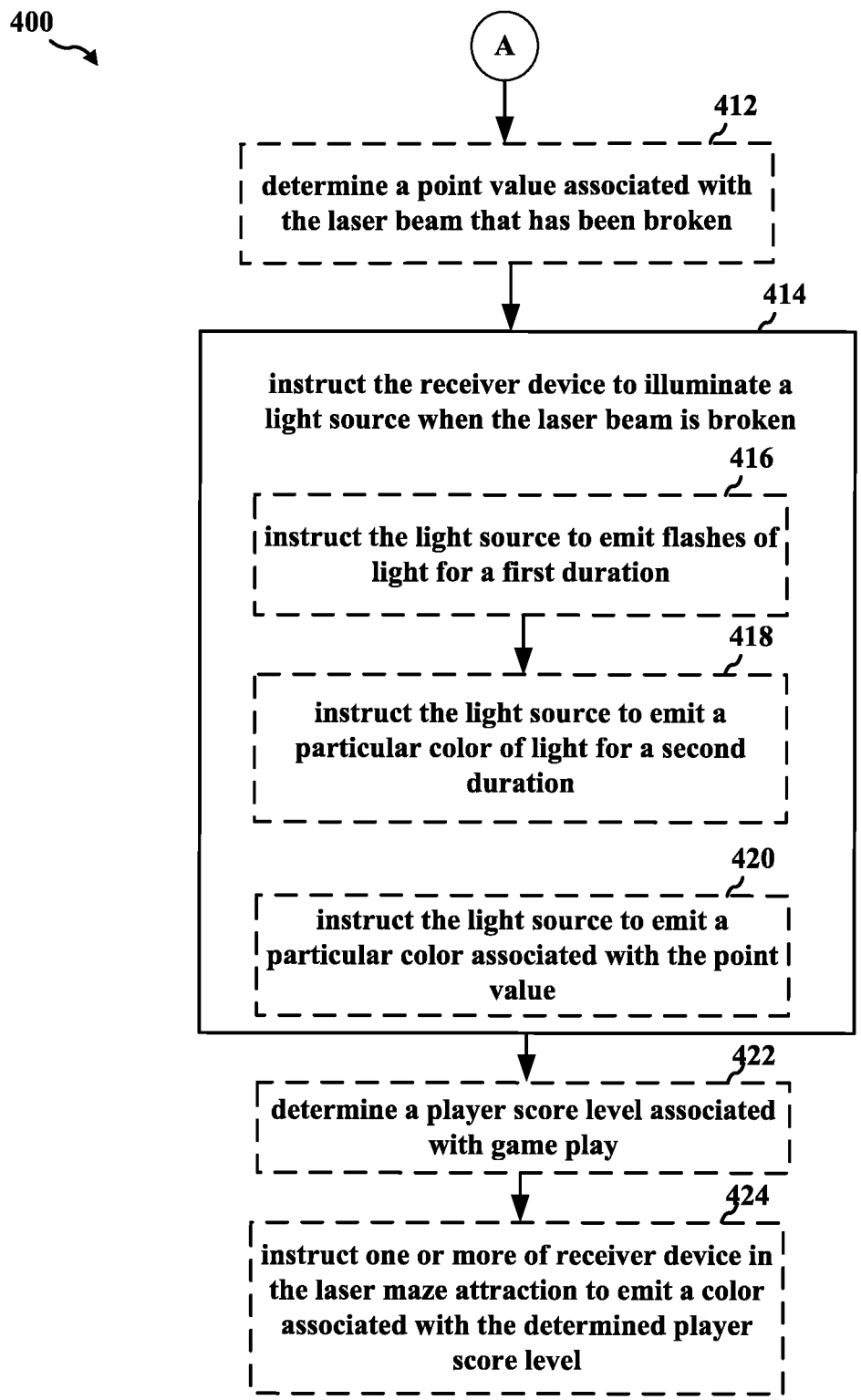

FIGS. 4A and 4B are a flowchart 400 of a method of operating a laser attraction. The method may be performed by an LCM (e.g., the LCM 255, the apparatus 802/802') of a laser attraction, such as a laser maze. For example, the LCM may be comprised in any of the example attractions illustrated in FIGS. 1 and 2A-2D. Operations indicated with dashed lines represent optional operations for various aspects of the disclosure.

Referring to FIG. 4A, at 402, the LCM may determine a game mode associated with the laser maze attraction. For example, referring to FIG. 1, the laser maze attraction 100 may be configured with different versions of the laser maze game. Each version of the laser maze game may combine different configurations of laser beams 101 that may be used to obstruct a path. For example, an easy version of the laser maze may have a subset of the entire set of lasers operational, while a difficult version of the laser maze game may have the entire set of lasers illuminated. In addition, different point values or scores may be assessed for each version of the game. In another aspect, the laser maze attraction 100 may be configured with different types of games. For example, the laser maze attraction 100 may be configured with a "Beam Buster" challenge in which the player 150 races through the maze and breaks as many laser beams as possible while being timed. In a different game, certain laser beams may be turned off and corresponding receiver devices illuminated as targets for the user to hit with a laser beam that is emitted from a user device (e.g., laser watch, laser pointer, or laser toy). The player 150 may acquire additional points for hitting the illuminated receiver device(s) while traversing the laser maze attraction 100.

Also referring to FIG. 4A, at 404, the LCM may instruct a plurality of laser transmitters to each emit a laser beam. In an aspect, each of the emitted lasers beam may be detected by a particular receiver device. For example, referring to FIG. 2A, multiple laser transmitters 204a, 204b, 204c, 204d, 204e, 204f, 204g may be positioned around the perimeter of maze enclosure 210. In an aspect, LCM 255 may instruct laser transmitters 204a, 204b, 204c, 204d, 204e, 204f, 204g to each emit a laser beam 201a, 201b, 201c, 203d, 203e, 201f, 201g. In an aspect, each of the laser beams may be detected by a corresponding receiver device 206a, 206b, 206c, 206d, 206e, 206f, 206g. In addition, referring to FIG. 2C, multiple laser transmitters 204a, 204b, 204c, 204d, 204e, 204f, 204g may be positioned around the perimeter of maze enclosure 210. In an aspect, LCM 255 may instruct laser transmitters 204a, 204b, 204c, 204d, 204e, 204f, 204g to each emit a laser beam 201a, 205b, 201c, 205d, 205e, 201f, 201g. In an aspect, laser beams may be detected by a corresponding receiver device 206a, 206b, 206c, 206d, 206e, 206f, 206g.

Additionally referring to FIG. 4A, at 406, the LCM may instruct a set of laser transmitters to not emit a laser beam. For example, referring to FIG. 2D, LMC may instruct a first set of laser transmitters 204b, 204e, 204g not to emit a laser beam.

Further referring to FIG. 4A, at 408, the LCM may instruct a set receiver devices to each emit a particular color or white light. In an aspect, each receiver device in the set of receiver devices may be associated with one of the laser transmitters in the set of laser transmitters that is instructed not to emit a laser beam. For example, referring to FIG. 2D, LCM 255 may instruct a first set receiver devices (e.g., receiver device 206b) to emit a first color of light 220b (e.g., blue light) and a second set of receiver devices (e.g., receiver devices 206e, 206g) to emit a second color of light 220r (e.g., red light).

Still referring to FIG. 4A, at 410, the LCM may receive a signal that indicates that one of the laser beams has been broken. In an aspect, the signal may be received from a receiver device that is associated with the broken laser beam. For example, referring to FIG. 2A, a player traversing the laser maze attraction 200 breaks the laser beam 203d emitted by laser transmitter 204d and the laser beam 203e emitted by laser transmitter 204e. In this example, the LCM 255 may receive a signal 275 from receiver device 206d that indicates that the corresponding laser beam 203d has been broken.

Referring to FIG. 4B, at 412, the LCM may determine a point value associated with the laser beam that has been broken. For example, referring to FIG. 2A, The LCM 255 may determine a point value associated with the laser beam that has been broken. In addition, the LCM 255 may send a signal 270 instructing the receiver device to emit a particular color 220 associated with the point value.

Referring again to FIG. 4B, at 414, the LCM may instruct the receiver device to illuminate a light source when the laser beam is broken. In an aspect, the light source may be part of the receiver device. For example, referring to FIG. 2A, upon determining that the laser beam 203e was broken, LCM 255 may send a signal 270 instructing receiver device 206e to illuminate 220 an associated light source (not seen in FIG. 2A). For example, the light source may be an LED positioned within or on the surface of the receiver device 206e. In addition, referring to FIG. 3, a detector 308 and light source 306 may be positioned behind the window 304 as to be protected from damage during game play. The detector 308 may be used to detect a laser beam, and the light source 306 may be used for purposes of illumination within the maze enclosure or for game effects. The detector 308 and/or light source 306 may be connected to an LCM (e.g., LCM 255) via a wired connection or a wireless connection.

Referring still to FIG. 4B, at 416, the LCM may instruct the receiver device to illuminate a light source when the laser beam is broken by instructing the light source to emit flashes of light for a first duration. For example, referring to FIG. 2A, the signal 270 sent by the LCM 255 may instruct receiver device 206d to emit flashes of light 220 for a first duration. For example, receiver device 206d may emit flashes of light 220 for five seconds to indicate that the laser beam 203d is broken.

Still referring to FIG. 4B, at 418, the LCM may instruct the receiver device to illuminate a light source when the laser beam is broken by instructing the light source to emit a particular color of light for a second duration. In an aspect, the second duration may follow the first duration. For example, referring to FIG. 2A, the signal 270 may instruct receiver device 206d to emit a particular color of light without flashing for a second duration. In an aspect, the second duration may follow the first duration. For example, receiver device 206d may emit flashes of light 220 for a first duration, and emit a particular color for the second duration.

Further referring to FIG. 4B, at 420, the LCM may instruct the receiver device to illuminate a light source when the laser beam is broken by instructing the light source to emit a particular color associated with the point value associated with the broken laser for a second duration. In an aspect, the second duration may follow the first duration. For example, referring to FIG. 2A, the signal 270 may instruct receiver device 206d to emit a particular color of light without flashing for a second duration. For example, the particular color may be associated with a point value associated with the broken laser beam 203d.

Referring again to FIG. 4B, at 422, the LCM may determine a player score level associated with game play. For example, referring to FIG. 2A, at the end of game play, the LCM 255 may determine a player score level associated with game play.

Referring still to FIG. 4B, at 424, the LCM may instruct one or more receiver devices in the laser maze attraction to emit a color associated with the determined player score level. For example, referring to FIG. 2A, the LCM 255 may send a signal 270 instructing one or more receiver devices 206a, 206b, 206c, 206d, 206e, 206f, 206g to emit a color associated with the determined player score level to alert the player of her/his score level.

Figure 5:
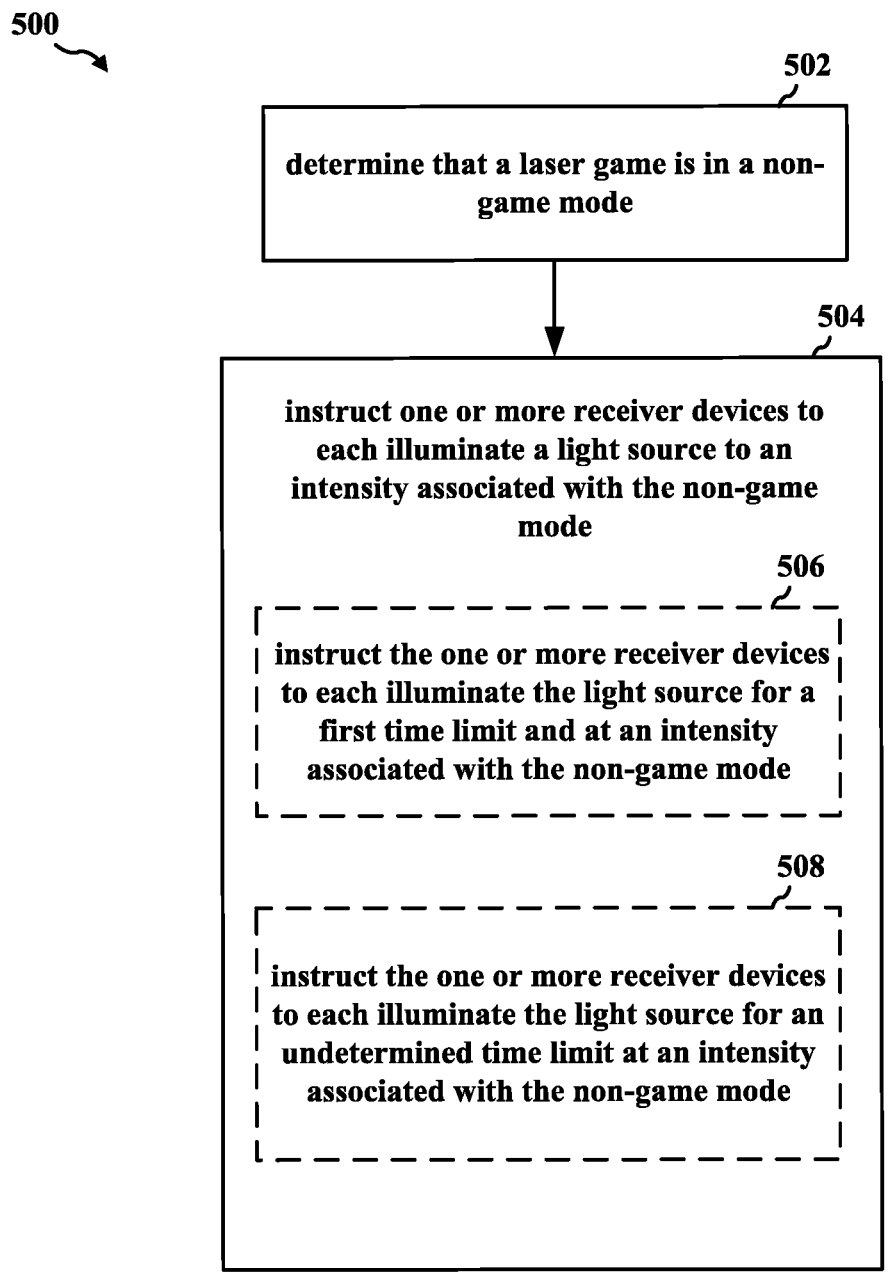
FIG. 5 is a flowchart of a method of operating a laser attraction.

FIG. 5 is a flowchart 500 of a method of operating a laser attraction. The method may be performed by an LCM (e.g., the LCM 255, the apparatus 802/802') of a laser attraction, such as a laser maze. For example, the LCM may be comprised in any of the example attractions illustrated in FIGS. 1 and 2A-2D. Operations indicated with dashed lines represent optional operations for various aspects of the disclosure.

At 502, the LCM may determine that a laser game is in non-game mode. For example, referring to FIG. 2B, the non-game mode may include at least one of a user exit period, an emergency situation, laser beam alignment procedure, a service period, a game idle period, and/or a pre-game period.

At 504, the LCM may instruct one or more receiver devices to each illuminate a light source to an intensity associated with the non-game mode. In an aspect, each of the one or more receiver devices may include a unique light source. For example, referring to FIG. 2B, LCM 255 may send a signal 270 to the laser maze attraction 215 instructing one or more of the receiver devices 206a, 206b, 206c, 206d, 206e, 206f, 206g to each illuminate 220 a light source when it is determined that game play has ended. In an aspect, each of the one or more receiver device 206a, 206b, 206c, 206d, 206e, 206f, 206g may each include a unique light source (e.g., an LED). For example, referring to FIG. 2B, LCM 255 may instruct each of the one or more receiver devices 206a, 206b, 206c, 206d, 206e, 206f, 206g to illuminate 220 an associated light source to an intensity associated with the user exit period, the emergency situation, the laser beam alignment procedure, the service period, the game idle period, and/or the pre-game period.

At 506, the LCM may instruct the one or more receiver devices to each illuminate a light source by instructing the one or more receiver devices to each illuminate the light source for a first time limit and at an intensity associated with the non-game mode when the non-game mode is associated with a time limit. In an aspect, a non-game mode that is associated with a time limit may be at least one of a user exit period and/or a pre-game period.

At 508, the LCM may instruct the one or more receiver devices to each illuminate a light source by instructing the one or more receiver devices to each illuminate the light source for an undetermined time limit when the non-game mode is not associated with a time limit. In an aspect, a non-game mode that is associated with a time limit may be one or more of an emergency situation, a laser beam alignment procedure, a service period, and/or a game idle period.

Figure 6:
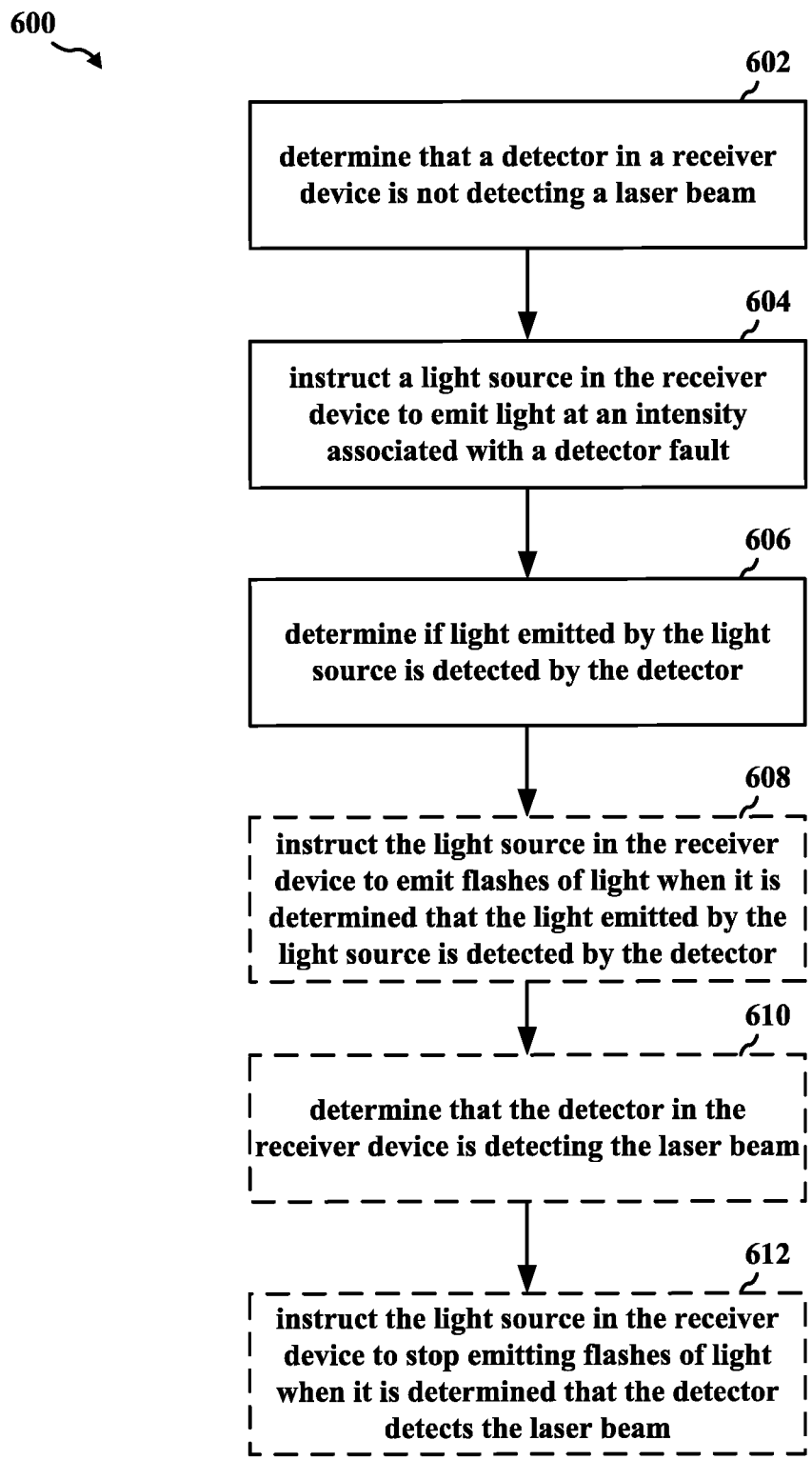
FIG. 6 is a flowchart of a method of operating a laser attraction.

FIG. 6 is a flowchart 600 of a method of operating a laser attraction. The method may be performed by an LCM (e.g., the LCM 255, the apparatus 802/802') of a laser attraction, such as a laser maze. For example, the LCM may be comprised in any of the example attractions illustrated in FIGS. 1 and 2A-2D. Operations indicated with dashed lines represent optional operations for various aspects of the disclosure.

At 602, the LCM may determine that a detector in a receiver device is not detecting a laser beam. For example, referring to FIG. 2C, the laser transmitters 204b, 204d, 204e are not properly aligned with the corresponding receiver devices 206b, 206d, 206e. In an aspect, LCM 255 may determine that receiver devices 206b, 206d, 206e (e.g., a detector in the receiver devices) are not detecting the corresponding laser beams 205b, 205d, 205e based on one or more signals 275 received from the receiver devices 206b, 206d, 206e.

At 604, the LCM may instruct a light source in the receiver device to emit light at an intensity associated with a detector fault, flash the light source, and/or both. For example, referring to FIG. 2C, to perform a diagnostic test of detector function, LCM 255 may instruct receiver devices 206b, 206d, 206e to each emit light 220 at an intensity that may be detected by a corresponding detector located in receiver devices 206b, 206d, 206e.

At 606, the LCM may determine if light emitted by the light source is detected by the detector. For example, referring to FIG. 2C, the LCM may receive a signal from the receiver devices 206b, 206d, 206e indicating the that light emitted by the light source is detected by corresponding detectors associated with receiver devices 206b, 206d, 206e.

At 608, the LCM may instruct the light source in the receiver device to emit flashes of light when it is determined that the light emitted by the light source is detected by the detector. For example, referring to FIG. 2C, the LCM 255 may send a signal 270 instructing the receiver devices 206b, 206d, 206e to emit flashes of light 220 when the LCM 255 determines that the light 220 emitted by the light source is detected by the detector. By emitting flashes of light 220, an operator may more easily determine which laser transmitters 204b, 204d, 204e require alignment.

At 610, the LCM may determine that the detector in the receiver device is detecting the laser beam. For example, referring to FIG. 2C, once the laser transmitters 204b, 204d, 204e are in proper alignment, the receiver devices 206b, 206d, 206e may send a signal 275 to the LCM 255 indicating that the laser detectors are detecting the corresponding laser beams 205b, 205d, 205e.

At 612, the LCM may instruct the light source in the receiver device to stop emitting flashes of light when it is determined that the detector detects the laser beam. For example, referring to FIG. 2C, the LCM 255 may send a signal 270 instructing the receiver devices 206b, 206d, 206e to stop emitting flashes of light 220 when the LCM 255 determines that the detector detects the laser beam.

Figure 7:
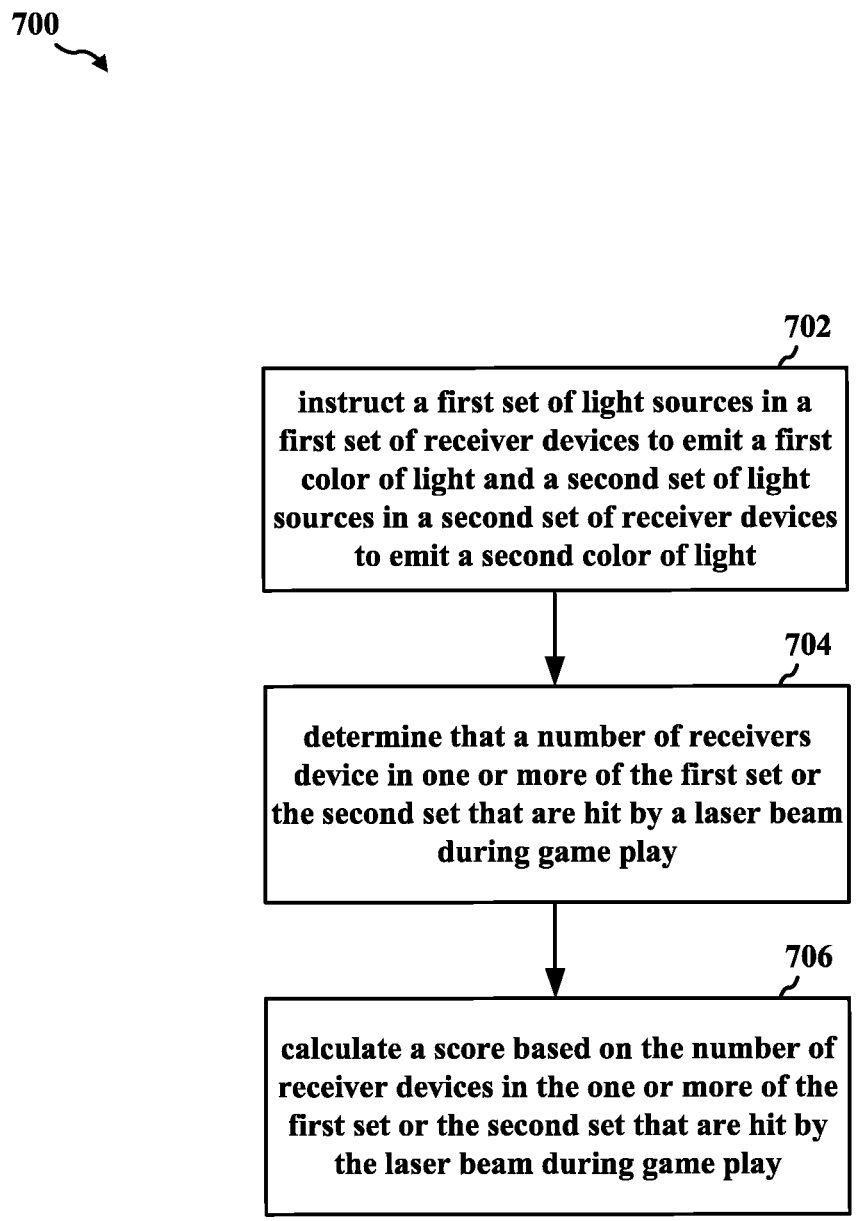
FIG. 7 is a flowchart of a method of operating a laser attraction.

FIG. 7 is a flowchart 700 of a method of operating a laser attraction. The method may be performed by an LCM (e.g., the LCM 255, the apparatus 802/802') of a laser attraction, such as a laser maze. For example, the LCM may be comprised in any of the example attractions illustrated in FIGS. 1 and 2A-2D. Operations indicated with dashed lines represent optional operations for various aspects of the disclosure.

At 702, the LCM may instruct a first set of light sources in a first set of receiver devices to emit a first color of light and a second set of light sources in a second set of receiver devices to emit a second color of light. For example, referring to FIG. 2D, LCM 255 may instruct a first set receiver devices (e.g., receiver device 206b) to emit a first color of light 220b (e.g., blue light) and a second set of receiver devices (e.g., receiver devices 206e, 206g) to emit a second color of light 220r (e.g., red light).

At 704, the LCM may determine that a number of receivers device in one or more of the first set or the second set that are hit by a laser beam during game play. For example, referring to FIG. 2D, the LCM 255 may determine that a number of receivers device 206b, 206e, 206g in the first set and/or the second set that are hit during game play.

At 706, the LCM may calculate a score based on the number of receiver devices in the one or more of the first set or the second set that are hit by the laser beam during game play. In an aspect, the score may be calculated based on a first point value associated with each of the receiver devices in the first set and a second point value associated with each of the receiver devices in the second set. For example, referring to FIG. 2D, In addition, LCM 255 may calculate a score based on the number of receiver devices in the first set and/or the second set that are hit during game play. For example, the score may be calculated based on a first point value (e.g., 2 points for a blue target) associated with each of the receiver devices in the first set and a second point value (e.g., five points for a red target) associated with each of the receiver devices in the second set.

Figure 8:
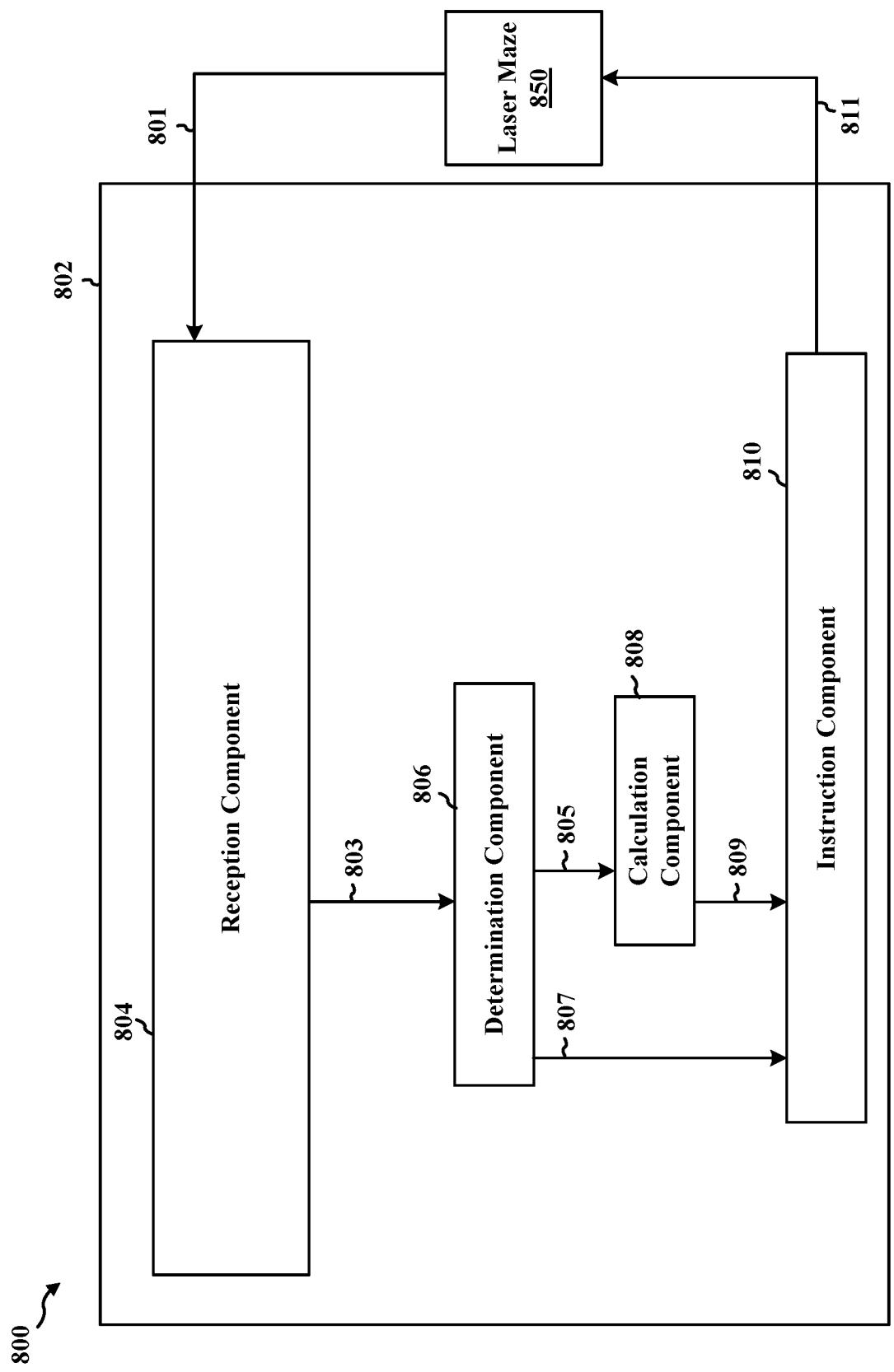
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be an LCM (e.g., LCM 255) that is in communication with, e.g., that controls operation of, a laser attraction 850, such as a laser maze. For example, the LCM may be comprised in any of the example attractions illustrated in FIGS. 1 and 2A-2D. The apparatus includes a reception component 804 that may receive a signal 801 from the laser maze attraction 850 that indicates that one of the laser beams has been broken, that a detector in a receiver device is not detecting a laser beam, and/or that a number of target receiver devices are hit by a laser pointed by a play. The reception component 804 may send a signal 803 to the determination component 806. The signal 803 may indicate information associated with the one or more signals 801 received from the laser maze attraction 850.

The determination component 806 may determine a game mode associated with the laser maze attraction 850, determine a point value associated with the laser beam that has been broken, determine a player score level associated with game play, determine that a laser game has ended, determine that a user exit period is beginning, determine that the laser game ended due to an emergency situation, determine that a service period is beginning, determine that a game idle period is beginning, determine that a pre-game period is beginning, determine that a detector in a receiver device is not detecting a laser beam, determine if light emitted by the light source is detected by the detector, determine that the detector in the receiver device is detecting the laser beam, and/or determine that a number of receivers device in one or more of the first set or the second set that are hit by a laser beam during game play. The determination component 806 may send a signal 805, 807 to the calculation component 808 and/or the instruction component 810. The signals 805, 807 may convey information determined by the determination component 806.

The calculation component 808 may calculate a score based on the number of receiver devices in the one or more of the first set or the second set that are hit by the laser beam during game play. The calculation component 808 may send a signal 809 to the instruction component 810 that includes information associated with the calculated score.

The instruction component 810 may send a signal 811 to the laser maze attraction 850 to instruct a plurality of laser transmitters to each emit a laser beam, instruct a set of laser transmitters to not emit a laser beam, instruct a set receiver devices to each emit a particular color, instruct the receiver device to illuminate a light source when the laser beam is broken, instruct the receiver device to illuminate a light source when the laser beam is broken by instructing the light source to emit flashes of light for a first duration, instruct the receiver device to illuminate a light source when the laser beam is broken by instructing the light source to emit a particular color of light for a second duration, instruct the receiver device to illuminate a light source when the laser beam is broken by instructing the light source to emit a particular color associated with the point value associated with the broken laser for a second duration, instruct one or more receiver devices in the laser maze attraction to emit a color associated with the determined player score level, instruct one or more receiver devices to each illuminate a light source when it is determined that the laser game has terminated, instruct each of the one or more receiver devices to illuminate an associated light source to an intensity associated with the user exit period, instruct each of the one or more receiver devices to illuminate an associated light source to an intensity associated with the emergency situation, instruct each of the one or more receiver devices to illuminate an associated light source to an intensity associated with the laser beam alignment procedure, instruct each of the one or more receiver devices to illuminate an associated light source to an intensity associated with the service period, instruct each of the one or more receiver devices to emit flashes of light during the game idle period, instruct each of the one or more receiver devices to illuminate an associated light source to an intensity associated with the pre-game period, instruct the one or more receiver devices to each illuminate the light source by setting an intensity of illumination for the unique light source included in each of the one or more receiver devices using pulse width modulation, instruct a light source in the receiver device to emit light at an intensity associated with a detector fault, instruct the light source in the receiver device to emit flashes of light when it is determined that the light emitted by the light source is detected by the detector, instruct the light source in the receiver device to stop emitting flashes of light when it is determined that the detector detects the laser beam, and/or instruct a first set of light sources in a first set of receiver devices to emit a first color of light and a second set of light sources in a second set of receiver devices to emit a second color of light.

The apparatus may include additional components that perform each of the blocks of the algorithm in the aforementioned flowcharts of FIGS. 4A, 4B, 5A, 5B, 6, and 7. As such, each block in the aforementioned flowcharts of FIGS. 4A, 4B, 5A, 5B, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
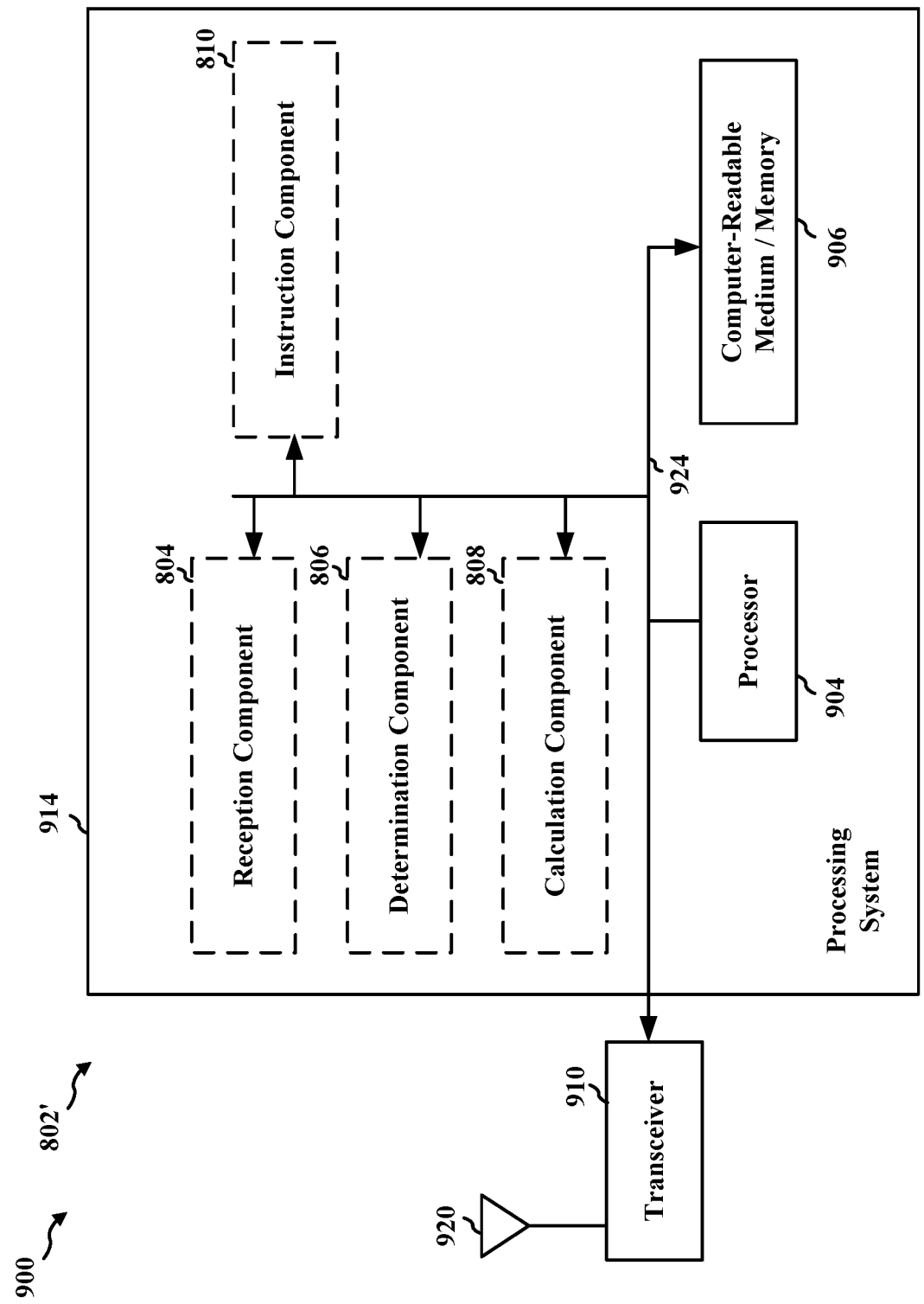
FIG. 9 is a diagram illustrating an example of a hardware implementation for an apparatus employing a processing system

FIG. 9 is a diagram 900 illustrating an example of a hardware implementation for an apparatus 802' employing a processing system 914 for operating a laser attraction such as a laser maze. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the instruction component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method for operating a laser attraction during a game mode, the laser attraction comprising a plurality of receivers each having a light source and a sensor configured to detect a corresponding laser beam, the method comprising:
   instructing a plurality of laser transmitters to each emit a laser beam during the game mode, each of the emitted laser beams being detected by a particular receiver device;
   receiving a signal that indicates that one of the laser beams has been broken during the game mode, the signal being received from a receiver device that is associated with the broken laser beam;
   instructing the receiver device associated with the broken laser beam to illuminate a light source of the receiver device when the laser beam is broken during the game mode, the light source being part of the receiver device;
   determining when the laser attraction transitions from the game mode to a non-game mode; and
   instructing the plurality of receivers to each illuminate the light sources comprised in the plurality of receivers upon determining that the laser attraction transitions from the game mode to the non-game mode.

2. The method of claim 1, wherein the instructing the receiver device to illuminate the light source of the receiver device comprises:
   instructing the light source of the receiver device to emit flashes of light or a first particular color for a first duration.

3. The method of claim 2, wherein the instructing the receiver device to illuminate the light source of the receiver device further comprises:
   instructing the light source of the receiver device to emit a second particular color of light for a second duration, the second duration following the first duration.

4. The method of claim 1, further comprising:
   determining an additional game mode associated with the laser attraction;
   instructing a set of laser transmitters to not emit a laser beam; and
   instructing a set receiver devices to each emit a particular color, each receiver device in the set of receiver devices being associated with one of the laser transmitters in the set of laser transmitters that is instructed not to emit a laser beam.

5. The method of claim 1, further comprising:
   determining a player score level associated with game play; and
   instructing one or more receiver devices in the laser attraction to emit a color associated with the determined player score level.

6. The method of claim 1, further comprising:
   determining a point value associated with the laser beam that has been broken.

7. The method of claim 6, wherein the instructing the receiver device to illuminate the light source of the receiver device further comprises:
   instructing the light source of the receiver device to emit a particular color associated with the point value.

8. The method of claim 1, further comprising:
   determining that a detector in a receiver device is not detecting a corresponding laser beam;
   instructing a light source comprised in the receiver device to emit light at an intensity associated with a detector fault;
   determining if light emitted by the light source is detected by the detector; and
   determining that the detector is not experiencing a detector fault when the detector detects the light emitted by the light source.

9. The method of claim 8, further comprising:
   instructing the light source in the receiver device to emit flashes of light when it is determined that the light emitted by the light source is detected by the detector.

10. The method of claim 9, further comprising:
    determining that the detector in the receiver device is detecting the laser beam; and
    instructing the light source in the receiver device to stop emitting flashes of light when it is determined that the detector detects the laser beam.

11. The method of claim 1, further comprising:
    instructing a first set of light sources in a first set of receiver devices to emit a first color of light and a second set of light sources in a second set of receiver devices to emit a second color of light;
    determining that a number of receiver devices in one or more of the first set or the second set are hit by a laser beam during game play; and
    calculating a score based on the number of receiver devices in the one or more of the first set or the second set that are hit by the laser beam during game play, the score being calculated based on a first point value associated with each of the receiver devices in the first set and a second point value associated with each of the receiver devices in the second set.

12. A laser attraction comprising:
a plurality of laser emitters;
a plurality of receivers each having one or more light sources and a sensor configured to detect a laser beam;
a controller configured to control the one or more light sources of each of the plurality of receivers;
a memory; and
at least one processor coupled to the memory and configured to:
instruct a plurality of laser transmitters to each emit a laser beam during a game mode, each of the emitted laser beams being detected by a particular receiver device;
receive a signal that indicates that one of the laser beams has been broken during the game mode, the signal being received from a receiver device that is associated with the broken laser beam;
instruct the receiver device for the corresponding broken laser beam to emit light from a corresponding light source comprised in the receiver when the laser beam is broken during the game mode;
determine when the laser attraction transitions from the game mode to a non-game mode; and
instruct the plurality of receivers to each illuminate the one or more light sources comprised in the plurality of receivers upon determining that the laser attraction transitions from the game mode to the non-game mode.

13. The laser attraction of claim 12, wherein the at least one processor is further configured to:
determine that a detector in a receiver device is not detecting a laser beam;
instruct a light source in the receiver device to emit light at an intensity associated with a detector fault; and
determine if light emitted by the light source is detected by the detector.

14. The laser attraction of claim 12, wherein the at least one processor is further configured to:
instruct a first set of light sources in a first set of receiver devices to emit a first color of light and a second set of light sources in a second set of receiver devices to emit a second color of light;
determine that a number of receiver devices in one or more of the first set or the second set that are illuminated by a laser beam or other light source during game play; and
calculate a score based on the number of receiver devices in the one or more of the first set or the second set that are hit by the laser beam during game play, the score being calculated based on a first point value associated with each of the receiver devices in the first set and a second point value associated with each of the receiver devices in the second set.

15. The laser attraction of claim 12, wherein the receiver device is instructed to emit flashes of light when the laser beam is broken during the game mode.

16. The laser attraction of claim 12, wherein the at least one processor is further configured to:
receive a signal that indicates that a laser beam is not received by a corresponding receiver during an alignment mode; and
instruct the corresponding receiver to emit light from the corresponding light source comprised in the receiver in response to receiving the signal that the laser beam is not received during the alignment mode.

17. The laser attraction of claim 16, wherein the corresponding receiver is instructed to emit flashes of light from the corresponding light source comprised in the receiver in response to receiving the signal that the laser beam is not received during the alignment mode.

18. The laser attraction of claim 13, wherein the at least one processor is further configured to:
determine that the detector is not experiencing a detector fault when the detector detects the light emitted by the light source.

19. The laser attraction of claim 18, wherein the at least one processor is further configured to:
instruct the light source in the receiver device to emit flashes of light when it is determined that the light emitted by the light source is detected by the detector.

20. The laser attraction of claim 19, wherein the at least one processor is further configured to:
determine that the detector in the receiver device is detecting the laser beam; and
instruct the light source in the receiver device to stop emitting flashes of light when it is determined that the detector detects the laser beam.

* * * * *